United States Patent
Zhang et al.

(10) Patent No.: US 10,537,821 B2
(45) Date of Patent: Jan. 21, 2020

(54) INTERACTIVE PLAY SETS

(71) Applicant: Microsoft Technology Licensing, LLC, Redmond, WA (US)

(72) Inventors: Haiyan Zhang, London (GB); James William Scott, Cambridge (GB); Nicolas Villar, Cambridge (GB); Alexandra Keeley Bunting, London (GB); Lee Jason Schuneman, London (GB); Michael Paul Rouse, Southampton (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 14/318,945

(22) Filed: Jun. 30, 2014

(65) Prior Publication Data

US 2015/0375134 A1 Dec. 31, 2015

(51) Int. Cl.
- A63F 13/21 (2014.01)
- A63H 33/26 (2006.01)
- A63F 13/327 (2014.01)
- A63F 13/235 (2014.01)

(52) U.S. Cl.
CPC ............ *A63H 33/26* (2013.01); *A63F 13/21* (2014.09); *A63F 13/235* (2014.09); *A63F 13/327* (2014.09)

(58) Field of Classification Search
CPC ....................... A63F 2003/00662; A63F 13/21
USPC ..................................... 463/46, 47; 345/156
See application file for complete search history.

(56) References Cited

U.S. PATENT DOCUMENTS

| | | | |
|---|---|---|---|
| 6,031,549 A | 2/2000 | Hayes-Roth | |
| 6,149,490 A | 11/2000 | Hampton et al. | |
| 6,159,101 A | 12/2000 | Simpson | |
| 6,290,565 B1 * | 9/2001 | Galyean, III | A63H 3/16 273/148 B |
| 6,305,688 B1 | 10/2001 | Waroway | |

(Continued)

FOREIGN PATENT DOCUMENTS

| | | |
|---|---|---|
| CN | 101207640 A | 6/2008 |
| CN | 103096987 A | 5/2013 |

(Continued)

OTHER PUBLICATIONS

Schweikardt, Eric, "Designing Modular Robots", Nov. 19, 2013, Available at: http://www.cmu.edu/architecture/research/grad_work/2009_phdcd_schweikardt_eric.pdf.

(Continued)

*Primary Examiner* — David L Lewis
*Assistant Examiner* — Ross A Williams
(74) *Attorney, Agent, or Firm* — Ray Quinney & Nebeker P.C.; John O. Carpenter

(57) ABSTRACT

An interactive play set is described which comprises one or more active physical play pieces. In an embodiment, each active physical play piece receives data from one or more other play pieces in the play set and uses this data to generate proximity data. The proximity data describes distances between two or more play pieces from which it receives data to three or more proximity levels. The proximity data is then transmitted to an interactive entertainment experience (such as a game) which reflects changes in proximity level. For example, the changes may be visible in a graphical user interface or another play piece or audible to a user.

21 Claims, 10 Drawing Sheets

(56) References Cited

U.S. PATENT DOCUMENTS

| | | |
|---|---|---|
| 6,454,624 B1 | 9/2002 | Duff et al. |
| 6,572,431 B1 | 6/2003 | Maa |
| 6,575,802 B2 | 6/2003 | Yim et al. |
| 6,629,591 B1 | 10/2003 | Griswold et al. |
| 6,682,392 B2 | 1/2004 | Chan |
| 6,773,322 B2 | 8/2004 | Gabai et al. |
| 6,773,344 B1 | 8/2004 | Gabai et al. |
| 6,877,096 B1 | 4/2005 | Chung et al. |
| 6,923,717 B2 | 8/2005 | Mayer et al. |
| 6,954,659 B2 | 10/2005 | Tushinsky et al. |
| 7,154,363 B2 | 12/2006 | Hunts |
| 7,439,972 B2 | 10/2008 | Timcenko |
| 7,568,963 B1* | 8/2009 | Atsmon .................. A63H 3/28 446/175 |
| 7,641,476 B2 | 1/2010 | Didur et al. |
| 7,695,338 B2 | 4/2010 | Dooley et al. |
| 7,749,089 B1 | 6/2010 | Briggs et al. |
| 8,058,837 B2 | 11/2011 | Beers et al. |
| 8,079,846 B1 | 12/2011 | Cookson |
| 8,087,939 B2 | 1/2012 | Rohrbach et al. |
| 8,157,611 B2 | 4/2012 | Zheng |
| 8,228,202 B2 | 7/2012 | Buchner et al. |
| 8,257,157 B2 | 9/2012 | Polchin |
| 8,292,688 B2* | 10/2012 | Ganz .................. G06Q 30/0222 446/175 |
| 8,317,566 B2 | 11/2012 | Ganz |
| 8,332,544 B1 | 12/2012 | Ralls et al. |
| 8,475,275 B2 | 7/2013 | Weston et al. |
| 8,548,819 B2 | 10/2013 | Chan et al. |
| 8,585,476 B2 | 11/2013 | Mullen |
| 8,628,414 B2 | 1/2014 | Walker et al. |
| 8,825,187 B1 | 9/2014 | Hamrick et al. |
| 8,854,925 B1 | 10/2014 | Lee et al. |
| 8,864,589 B2* | 10/2014 | Reiche, III ............... A63F 13/02 463/32 |
| 8,894,459 B2* | 11/2014 | Leyland ................ H01F 7/0263 446/139 |
| 8,894,462 B2* | 11/2014 | Leyland .................. A63F 13/02 446/175 |
| 9,008,310 B2* | 4/2015 | Nelson .................... A63F 13/02 380/251 |
| 9,180,378 B2* | 11/2015 | Reiche ..................... A63F 13/79 |
| 9,387,407 B2* | 7/2016 | Vignocchi .............. A63F 13/65 |
| 9,409,084 B2* | 8/2016 | Horovitz ................ A63F 13/06 |
| 9,696,757 B2 | 7/2017 | Scott et al. |
| 9,919,226 B2 | 3/2018 | Scott et al. |
| 2002/0196250 A1 | 12/2002 | Anderson et al. |
| 2003/0030595 A1 | 2/2003 | Radley-smith |
| 2004/0053690 A1 | 3/2004 | Fogel et al. |
| 2005/0132290 A1 | 6/2005 | Buchner et al. |
| 2005/0227811 A1 | 10/2005 | Shum et al. |
| 2005/0255916 A1 | 11/2005 | Chen |
| 2006/0058018 A1 | 3/2006 | Toulis et al. |
| 2007/0097832 A1 | 5/2007 | Koivisto et al. |
| 2007/0155505 A1 | 7/2007 | Huomo |
| 2007/0198117 A1 | 8/2007 | Wajihuddin |
| 2007/0211047 A1* | 9/2007 | Doan ....................... A63F 1/04 345/419 |
| 2007/0218988 A1 | 9/2007 | Lucich |
| 2007/0279852 A1 | 12/2007 | Daniel et al. |
| 2007/0293319 A1 | 12/2007 | Stamper et al. |
| 2008/0014835 A1 | 1/2008 | Weston et al. |
| 2008/0045283 A1 | 2/2008 | Stamper et al. |
| 2008/0076519 A1 | 3/2008 | Chim |
| 2008/0085773 A1* | 4/2008 | Wood .................... A63F 13/02 463/43 |
| 2008/0153559 A1 | 6/2008 | De Weerd |
| 2008/0280684 A1 | 11/2008 | Mcbride et al. |
| 2009/0008875 A1 | 1/2009 | Wu et al. |
| 2009/0029771 A1 | 1/2009 | Donahue |
| 2009/0047865 A1 | 2/2009 | Nakano |
| 2009/0048009 A1 | 2/2009 | Brekelmans et al. |
| 2009/0053970 A1 | 2/2009 | Borge |
| 2009/0081923 A1 | 3/2009 | Dooley et al. |
| 2009/0082879 A1 | 3/2009 | Dooley et al. |
| 2009/0094287 A1 | 4/2009 | Johnson et al. |
| 2009/0104988 A1 | 4/2009 | Enge et al. |
| 2009/0206548 A1 | 8/2009 | Hawkins et al. |
| 2009/0251419 A1 | 10/2009 | Radely-smith |
| 2009/0265642 A1 | 10/2009 | Carter et al. |
| 2009/0291764 A1 | 11/2009 | Kirkman et al. |
| 2009/0307592 A1 | 12/2009 | Kalanithi et al. |
| 2010/0009747 A1 | 1/2010 | Reville et al. |
| 2010/0026698 A1 | 2/2010 | Reville et al. |
| 2010/0035726 A1 | 2/2010 | Fisher et al. |
| 2010/0103075 A1 | 4/2010 | Kalaboukis et al. |
| 2010/0113148 A1 | 5/2010 | Haltovsky et al. |
| 2010/0144436 A1 | 6/2010 | Marks et al. |
| 2010/0167623 A1 | 7/2010 | Eyzaguirre et al. |
| 2010/0274902 A1 | 10/2010 | Penman et al. |
| 2010/0279823 A1 | 11/2010 | Waters |
| 2011/0021109 A1 | 1/2011 | Le et al. |
| 2011/0172015 A1 | 7/2011 | Ikeda et al. |
| 2011/0215998 A1 | 9/2011 | Fitzgerald et al. |
| 2011/0239143 A1 | 9/2011 | Ye et al. |
| 2012/0007817 A1 | 1/2012 | Heatherly et al. |
| 2012/0050198 A1 | 3/2012 | Cannon |
| 2012/0052931 A1 | 3/2012 | Jaqua et al. |
| 2012/0052934 A1 | 3/2012 | Maharbiz et al. |
| 2012/0122059 A1 | 5/2012 | Schweikardt et al. |
| 2012/0190453 A1 | 7/2012 | Skaff et al. |
| 2012/0268360 A1 | 10/2012 | Mikhailov |
| 2012/0286629 A1 | 11/2012 | Johnson et al. |
| 2012/0295700 A1 | 11/2012 | Reiche |
| 2012/0295704 A1 | 11/2012 | Reiche et al. |
| 2013/0109267 A1 | 5/2013 | Schweikardt et al. |
| 2013/0109272 A1 | 5/2013 | Rindlisbacher |
| 2013/0122753 A1 | 5/2013 | Blakborn |
| 2013/0165223 A1 | 6/2013 | Leyland et al. |
| 2013/0173658 A1 | 7/2013 | Adelman et al. |
| 2013/0196766 A1 | 8/2013 | Leyland et al. |
| 2013/0196770 A1 | 8/2013 | Barney et al. |
| 2013/0231193 A1 | 9/2013 | Heatherly et al. |
| 2013/0271390 A1 | 10/2013 | Lyons et al. |
| 2013/0288563 A1 | 10/2013 | Zheng et al. |
| 2013/0324239 A1 | 12/2013 | Ur et al. |
| 2014/0002580 A1 | 1/2014 | Bear et al. |
| 2014/0011595 A1 | 1/2014 | Muller |
| 2014/0055352 A1 | 2/2014 | Davis et al. |
| 2014/0141865 A1 | 5/2014 | Tropper et al. |
| 2014/0181820 A1* | 6/2014 | Vignocchi ............... A63F 13/10 718/100 |
| 2014/0213357 A1 | 7/2014 | Claffey |
| 2014/0235198 A1 | 8/2014 | Lee et al. |
| 2014/0235353 A1 | 8/2014 | Witchey |
| 2016/0051904 A1* | 2/2016 | Abir ..................... A63H 33/042 446/484 |
| 2016/0101361 A1 | 4/2016 | Scott et al. |
| 2016/0101364 A1 | 4/2016 | Scott et al. |
| 2016/0104321 A1 | 4/2016 | Scott et al. |
| 2017/0232347 A1 | 8/2017 | Scott et al. |

FOREIGN PATENT DOCUMENTS

| | | |
|---|---|---|
| CN | 103236720 A | 8/2013 |
| CN | 103443743 A | 12/2013 |
| CN | 203434701 U | 2/2014 |
| CN | 103999012 A | 8/2014 |
| EP | 1444662 A2 | 8/2004 |
| JP | S5429063 B2 | 9/1979 |
| JP | H09205733 A | 8/1997 |
| JP | 2003038842 A | 2/2003 |
| JP | 2013135374 A | 7/2013 |
| WO | 2001012285 A1 | 2/2001 |
| WO | WO0112285 A1 | 2/2001 |
| WO | 2001069799 A2 | 9/2001 |
| WO | 2001069829 A2 | 9/2001 |
| WO | WO0169799 A2 | 9/2001 |
| WO | WO2001069829 A2 | 9/2001 |
| WO | 03027970 A2 | 4/2003 |
| WO | 2009037679 A1 | 3/2009 |

(56) References Cited

FOREIGN PATENT DOCUMENTS

| WO | WO2009037679 A1 | 3/2009 |
|---|---|---|
| WO | 2012160055 A1 | 11/2012 |
| WO | WO2012160055 A1 | 11/2012 |

OTHER PUBLICATIONS

"Skylanders Swapforce", Sep. 11, 2013, Available at: http://www.skylanders.com/swapforce.
"Disney Infinity", Nov. 19, 2013, Available at: https://infinity.disney.com/en-gb.
"Cubelets", Sep. 11, 2013, Available at: http://www.modrobotics.com/.
"Shapeways", Nov. 19, 2013, Available at: http://shapeways.com/.
Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.
Kikin-Gil, Ruth, "BuddyBeads", Published on: Oct. 10, 2006, Available at: http://www.ruthkikin.com/Images/r.kikin-gil_thesis2005.pdf.
Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.
Labrune, et al., "Telebeads: Social Network Mnemonics for Teenagers", In Proceedings of Conference on Interaction Design and Children, Jun. 7, 2006, 8 pages.
Ahde, et al., "Hello—Bracelets Communicating Nearby Presence of Friends", In Proceedings of the Tenth Anniversary Conference on Participatory Design, Sep. 30, 2008, 3 pages.
Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZIe-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.
Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.
Lampe, et al., "Integrating Interactive Learning Experiences into Augmented Toy Environments", In Proceedings of the Pervasive Learning Workshop at the Pervasive Conference, May 2007, 8 pages.
"Seebo Platform", Published on: Jun. 22, 2013, Available at: http://www.seebo.com/.
Raffle, et al., "Topobo: A Constructive Assembly System with Kinetic Memory", In Proceedings of the SIGCHI Conference on Human Factors in Computing Systems, Apr. 24, 2004.
Schmid, et al., "Networking Smart Toys with Wireless ToyBridge and ToyTalk", In IEEE International Conference on Computer Communications, Apr. 10, 2011, 2 pages.
Patrizia, et al., "A Robotic Toy for Children with special needs: From requirements to Design", In IEEE 11th International Conference on Rehabilitation Robotics, Nov. 20, 2013, 6 pages.
Zaino, Jennifer, "JNFC Technology Brings New Life to Games", In Journal of RFID, Oct. 1, 2012, 10 pages.
U.S. Appl. No. 14/203,991, Zhang, et al., "Generation of Custom Modular Objects", filed Mar. 11, 2014.
U.S. Appl. No. 14/204,239, Zhang, et al., "Gaming System for Modular Toys", filed Mar. 11, 2014.
U.S. Appl. No. 14/204,483, Saul, et al., "Interactive Smart Beads", filed Mar. 11, 2014.
U.S. Appl. No. 14/204,740, Saul, et al., "A Modular Construction for Interacting with Software", filed Mar. 11, 2014.

U.S. Appl. No. 14/204,929, Zhang, et al., "Storing State for Physical Modular Toys", filed Mar. 11, 2014.
U.S. Appl. No. 14/205,077, Zhang, et al., "Data Store for a Modular Assembly System", filed Mar. 11, 2014.
"Disney Infinity", Published on: Aug. 25, 2013, Available at: http://www.essentialkids.com.au/entertaining-kids/games-and-technology/disney-infinity-20130823-2sgg0.html.
Marshall, Rick, "Skylanders: Swap Force Review" Published on: Nov. 1, 2013, Available at: http://www.digitaltrends.com/game-reviews/skylanders-swap-force-review/.
Jennings, et al., "CONSTRUCT/VizM: A Framework for Rendering Tangible constructions", In Proceedings of the 14th Congress of the Iberoamerican Society of Digital Graphics, Nov. 17, 2010, 4 pages.
Kitamura, et al., "Real-time 3D Interaction with ActiveCube", In Proceedings of Extended Abstracts on Human Factors in Computing Systems, Mar. 31, 2001, 2 pages.
"Siftables are Changing the Shape of Computing", Published on: May 9, 2010, Available at: http://singularityhub.com/2010/05/05/siftables-are-changing-the-shape-of-computing/.
'Cuff—fashion wearable bracelets', 2014 Available at: http://www.elle.com/_mobile/news/fashion-accessories/cufflinc-wearable-techsrc=spr_TWITTER&spr_id=1448_51714286&linkId=7882609.
'Prodigy—Kickstarter', 2014 Available at: https://www.kickstarter.com/projects/121511007/prodigy-the-game.
Construkts—Part time UI/UX and Engineer Positions, 2014 Available at: http://www.construkts.com.
"Second Written Opinion Issued in PCT Application No. PCT/US2015/038215," dated Jun. 10, 2016, 9 pages.
"International Search Report & Written Opinion Received for PCT Application No. PCT/US2015/038215", dated Oct. 8, 2015, 11 Pages.
"International Preliminary Report on Patentability Issued in PCT Application No. PCT/US2015/038215," dated Sep. 23, 2016, 10 Pages.
"Final Office Action Issued in U.S. Appl. No. 14/509,919", dated Jan. 2, 2019, 18 Pages.
"Office Action Issued in European Patent Application No. 15782188.5", dated Feb. 14, 2019, 4 Pages.
"First Office Action and Search Report Issued in Chinese Patent Application No. 201580036030.0", dated Jan. 31, 2019, 16 Pages.
"Proxi In-Device Charging Solution", Retrieved From: http://powerbyproxi.com/consumer-electronics/industrial/proxi-in-device-charging-solution/, May 19, 2013, 8 Pages.
"World of Warcraft Crafting Skills", Retrieved From: https://web.archive.org/web/20140527091410/http://us.battle.net/wow/en/, May 27, 2014, 3 Pages.
"Non Final Office Action Issued in U.S. Appl. No. 14/509,862", dated Apr. 6, 2017, 15 Pages.
"Non Final Office Action Issued in U.S. Appl. No. 14/509,919", dated Jun. 13, 2018, 18 Pages.
"Non Final Office Action Issued in U.S. Appl. No. 14/509,940", dated Oct. 6, 2016, 26 Pages.
"Final Office Action Issued in U.S. Appl. No. 15/582,146", dated Jul. 9, 2018, 25 Pages.
"Non Final Office Action Issued in U.S. Appl. No. 15/582,146", dated Oct. 5, 2017, 35 Pages.
Betters, Elyse, "LeapFrog LeapBand is an Activity Band for Kids with Virtual Pet Capabilities", Retrieved From: https://uk.news.yahoo.com/leapfrog-leapband-activity-band-kids-virtual-pet-capabilities-231500937.html.guccounter=1, May 1, 2014, 1 Page.
Murphy, Samantha, "The Reinvented Tamagotchi: Bright, Flashy and Just as Needy", Retrieved From: http://mashable.com/2014/02/20/tamagotchi-friends/, Feb. 20, 2014, 22 Pages.
"International Preliminary Report on Patentability Issued in PCT Application No. PCT/US2015/054103", dated Jul. 21, 2016, 5 Pages.
"International Search Report & Written Opinion Received for PCT Application No. PCT/US2015/054103", dated Feb. 1, 2016, 12 Pages.
Persson, Markus, "Minecraft", Retrieved From: https://web.archive.org/web/20140531165512/https://minecraft.net/game, May 27, 2014, 3 Pages.

(56) References Cited

OTHER PUBLICATIONS

Webster, Andrew, "Nex Band is a Smart, Modular Charm Bracelet for Gaming on Your Wrist", Retrieved From: http://www.theverge.com/2014/2/13/5289404/nex-band-is-a-smart-modular-charm-bracelet, Feb. 13, 2014, 4 Pages.

Wu, Yingying, "Customizable Wristband Sensor for Healthcare Monitoring 24/7", Retrieved From: http://marblar.com/idea/493o7, Nov. 14, 2013, 4 Pages.

"Non Final Office Action Issued in U.S. Appl. No. 15/582,146", dated Nov. 19, 2018, 22 Pages.

"Final Office Action Issued in U.S. Appl. No. 15/582,146", dated Apr. 4, 2019, 25 Pages.

"First Office Action and Search Report Issued in Chinese Patent Application No. 201580054924.2", dated May 24, 2019, 13 Pages.

"Second Office Action Issued in Chinese Patent Application No. 201580036030.0", dated Jun. 18, 2019, 23 Pages.

"Second Office Action Issued in Chinese Patent Application No. 201580054924.2", dated Aug. 9, 2019, 9 Pages.

"Third Office Action Issued in Chinese Patent Application No. 201580054924.2", dated Sep. 20, 2019, 7 Pages.

"Office Action Issued in Japanese Patent Application No. 2017-518972", dated Sep. 24, 2019, 9 Pages.

\* cited by examiner

INTERACTIVE PLAY SETS

BACKGROUND

There are many ways that a user can interact with a computer game and typically a user controls the game via a keyboard and mouse, games controller (which may be handheld and detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known apparatus for interacting with interactive entertainment experiences, such as computer games.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

An interactive play set is described which comprises one or more active physical play pieces. In an embodiment, each active physical play piece receives data from one or more other play pieces in the play set and uses this data to generate proximity data. The proximity data describes distances between two or more play pieces from which it receives data to three or more proximity levels. The proximity data is then transmitted to an interactive entertainment experience (such as a game) which reflects changes in proximity level. For example, the changes may be visible in a graphical user interface or another play piece or audible to a user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
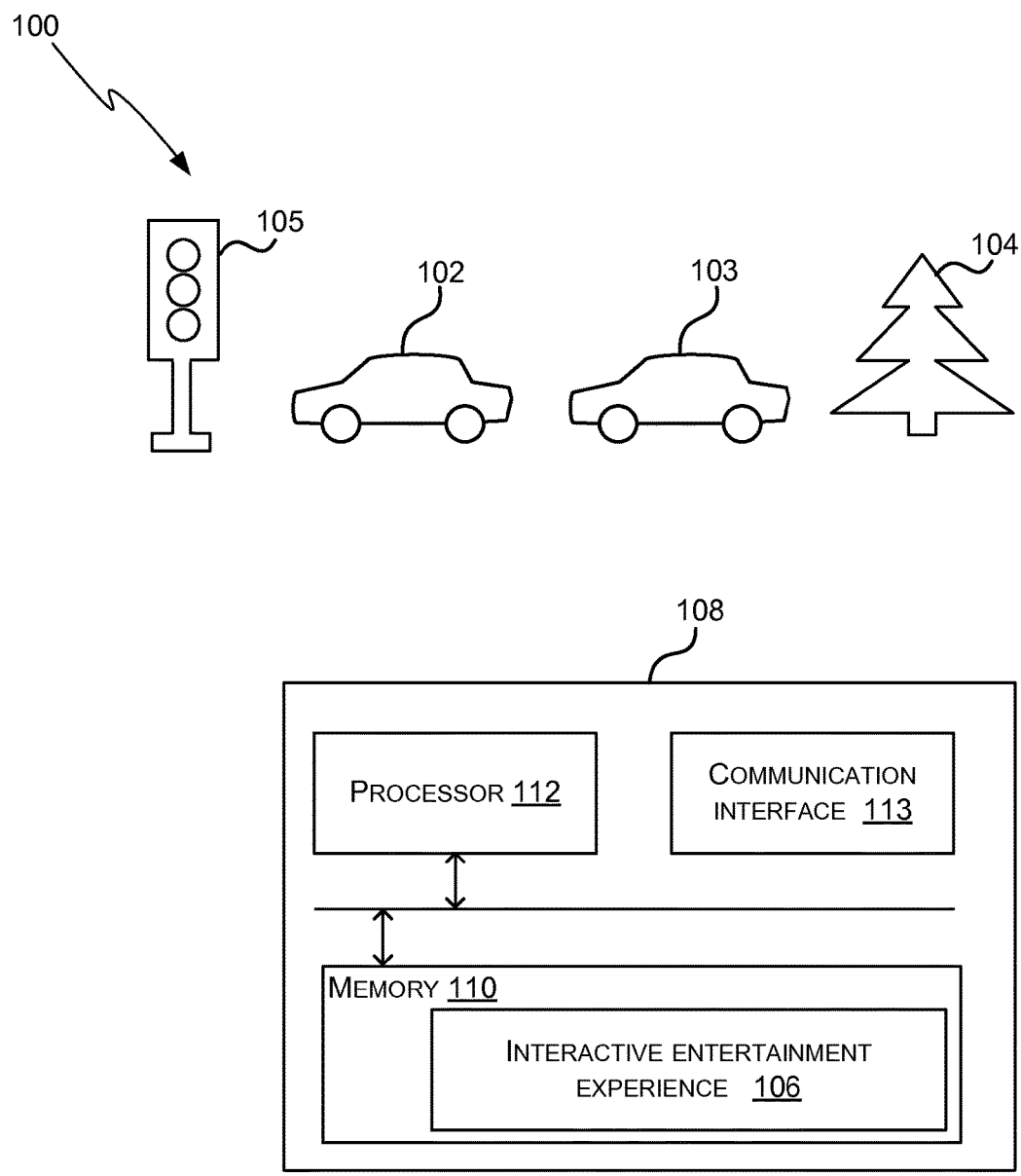
FIG. 1 shows a schematic diagram of a play set 100 which comprises one or more physical play pieces.

FIG. 1 shows a schematic diagram of a play set 100 which comprises one or more physical play pieces 102-105. At least one of the play pieces in the set (and in various examples at least two of the play pieces) are active play pieces which receive signals from other play pieces and generate proximity data describing distances between two or more play pieces in the set (e.g. the proximity data describes distances between the particular active play piece and one or more other play pieces and/or distances between two or more other play pieces). An active piece also communicates the proximity data to an interactive entertainment experience 106 either directly or via one or more intermediaries (where an intermediary may be another active play piece). Changes in the proximity data are then reflected in the interactive entertainment experience. The interactive entertainment experience 106 is therefore described as being associated with the play set 100.

As described in more detail below, the physical play pieces (and hence the play set) provide an intuitive user input means for the associated interactive entertainment experience. This may be particularly useful for younger or less dexterous users for whom traditional input devices (e.g. mouse, keyboard, joystick) may be more difficult to manipulate. This may also provide a more enjoyable or natural experience than interacting solely through a traditional computer input device such as a keyboard, game controller or touchscreen.

Figure 7:
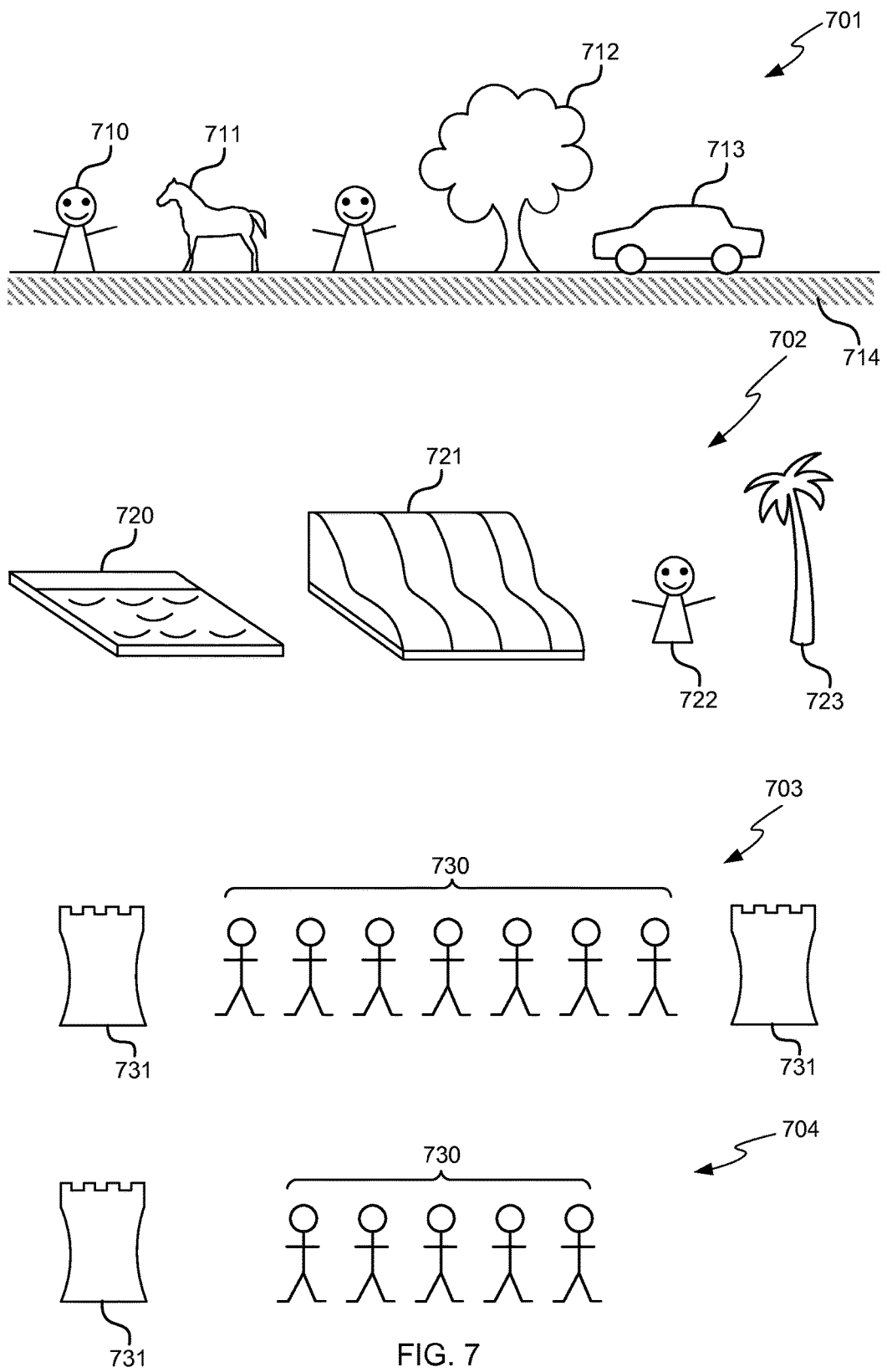
FIG. 7 shows four more example play sets.
Figure 9:
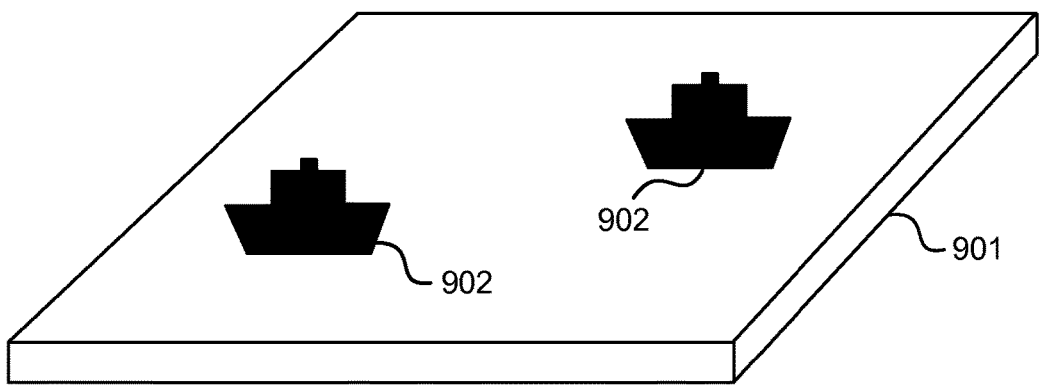
FIG. 9 shows a further example play set.

In various examples (e.g. as shown in FIGS. 7 and 9) the physical play pieces may be shaped to represent particular characters or objects (and hence they may have an irregular shape) and in various examples the shape and appearance of a physical play piece may correspond to the shape and appearance of an entity within the interactive entertainment experience.

By reflecting changes in proximity data within an interactive entertainment experience, the user experience of playing with the play set is enhanced (e.g. through visual or audio effects triggered by the interactive entertainment experience). In various examples, the interactive entertainment experience may enable a multi-user experience, including in some examples where the users are remote from each other (e.g. not in the same room) and where one or more of the users have a play set as described herein.

The associated interactive entertainment experience 106, which may comprise a computer game, virtual world or media entertainment experience (e.g. an interactive movie), runs on a computing device 108 which may be a desktop or laptop computer, a games console, a handheld computing-device (e.g. a smart phone, tablet computer or handheld games console), a cloud-based computing device, a dedicated game hardware device (i.e. a device that is dedicated to running the interactive entertainment experience 106, rather than a console that can run many different games and which in various examples may be part of the play set, e.g. an active play piece) or any other computing device. In various examples, the computing device 108 may be integrated within one of the active physical play pieces. In the example shown in FIG. 1, the interactive entertainment experience 106 is stored in memory 110 in the computing device 108 and comprises device-executable instructions which are executed by a processor 112. In other examples, however, the interactive entertainment experience 106 may run on a remote computing device (e.g. a cloud based computing device) and the computing device 108 may comprise software (e.g. a browser or application) which interfaces to the remote computing device (e.g. in order to render a graphical user interface for the interactive entertainment experience 106. The interactive entertainment experience 106 receives data from the active pieces 103 via a communication interface 113 in the computing device 108 and reflects changes in the distance between play pieces within the interactive entertainment experience 106 (e.g. through visual effects, sounds, etc.). It will be appreciated that the computing device 108 may also comprise additional elements and the computing device 108 is described in more detail below with reference to FIG. 10.

In various examples all the play pieces in a play set are active play pieces. In other examples, however, a play set may comprise one or more active play pieces and one or more other play pieces which are not active play pieces. These other play pieces may be semi-active play pieces (which transmit signals to other play pieces but do not generate proximity data) or passive play pieces (which do not transmit any signals). Consequently, in generating proximity data for two or more play pieces in the set (using signals received by the receiver), an active play piece generates proximity data describing the distance between itself and an active or semi-active play piece or between two other play pieces each of which is either an active or semi-active play piece. In various examples, an active piece may also be arranged to sense the position of a passive piece (i.e. a piece which does not transmit any signals), in which case an active play piece may also be able to generate proximity data describing the distance between an active or semi-active play piece and the passive play piece.

Figure 2:
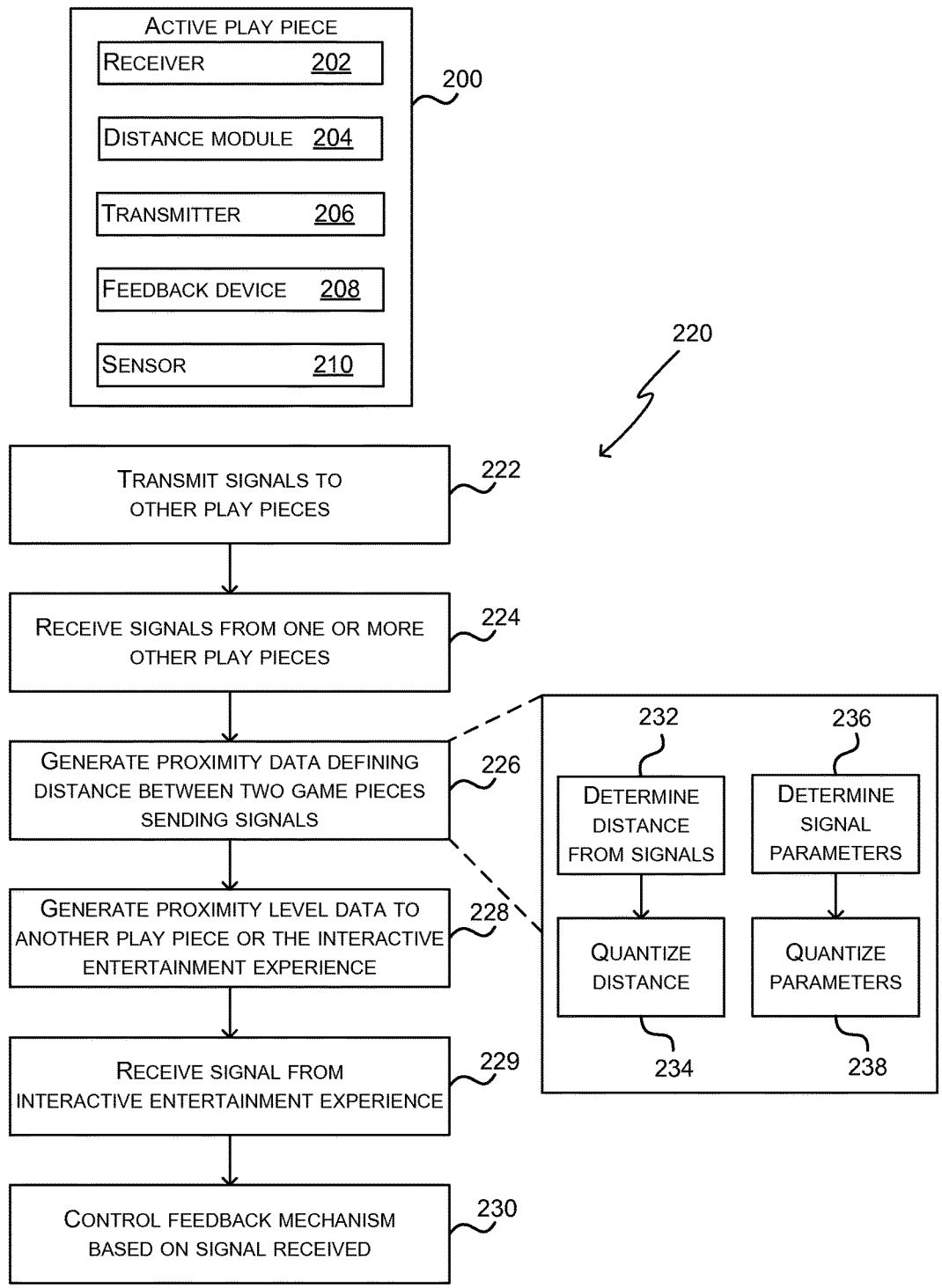
FIG. 2 is a schematic diagram of an active play piece and a flow diagram of an example method of operation of an active play piece.

FIG. 2 shows a schematic diagram of an active play piece 200 and a flow diagram 220 of an example method of operation of an active play piece 200. The active play piece 200 comprises a receiver 202, a distance module 204 (which may be implemented in hardware, software or a combination of the two) and a transmitter 206. The receiver 202 is arranged to receive signals from one or more other play pieces within the set 100 (block 224) and the signals which are received (in block 224) may comprise proximity data and/or be signals used for distance determination which were transmitted by other play pieces within the play set. In various examples the signals used for distance determination may use a different technology or protocol to the signals used to receive proximity data and in such cases the active play piece may comprise two receivers 202 (one for receiving signals used for distance determination from other active/semi-active play pieces and one for receiving proximity data from other active pieces). Where an active play piece is arranged to detect passive play pieces, the active play piece may comprise a receiver or sensor arrangement for detecting the passive piece (e.g. using ultrasound echo location or laser rangefinder scanning).

In various examples, an active play piece may also be the dedicated game hardware device which runs the interactive software experience 106. In such an example, the transmitter 206 may be omitted from that particular active play piece.

In various examples, an active play piece 200 may also be arranged to receive signals (e.g. commands) from the interactive entertainment experience 106 (block 229). These signals may be received via a receiver 202 which is also arranged to receive signals from other play pieces or a separate receiver 202 may be provided (not shown in FIG. 2). In such examples, the active play piece 200 may also comprise one or more LEDs or other device which provides feedback to the user 208 and which is controlled by the interactive entertainment experience via these signals (e.g. a speaker, vibrator, motor, olfactory/smell generator, e-paper, other type of display, heater/cooler such as a peltier pump, use of electric potential to generate friction effects or other stimulation, haptic output, shape-changing devices such as muscle wire), etc.). On receipt of a signal/command (in block 229), the active play piece 200 controls the feedback device 208 based on the signal received (block 230). Use of such commands by the interactive entertainment experience to control devices within a play piece is described further with reference to FIG. 4. Use of a feedback device 208 enhances the users game play experience with the physical play set, e.g. by making the experience more realistic.

The distance module 204 is arranged to generate proximity data describing distances between two or more play pieces sending signals (i.e. active or semi-active play pieces) based on signals received via the receiver 202 (block 226). There are many different ways in which distances may be determined and various examples are described in more detail below. The distance module 204 may generate proximity data to at least three discrete, non-overlapping levels of proximity (which may also be referred to as 'distance states'), where these levels (or states) may be:

Lack of proximity—the two play pieces are not sufficiently close to each other to be deemed proximate and this may be defined with reference to a threshold, where the threshold may be a distance (e.g. >50 cm) or a parameter of the received signal (e.g. signal strength <−50 dBm);

Distant proximity—the two play pieces are closer together than in the previous level, but are still not close together and again this may be defined with reference to one or more thresholds or range (e.g. 5-50 cm, −40 dBm--50 dBm); and Close proximity—the two play pieces are close together and again this may be defined with reference to a threshold or range (e.g. <5 cm, >−40 dBm) and this proximity level may, in various examples, include play pieces which are in contact with each other.

In various examples, the distance module 204 may generate proximity data to more than three discrete levels of proximity and in an example a further (e.g. fourth) proximity level may be:

Connected/attached—the two play pieces are physically connected to each other (to form a coherent physical whole) and where this proximity level is used, the level close proximity does not include two play pieces which are connected/attached.

In various examples, a different further level may also be used (in addition to or instead of connected/attached), where this fourth/fifth proximity level may be:

Inside/outside—the two play pieces are nested together such that one fits inside the other and this may be used where a play piece is hollow or has an aperture to receive another play piece (e.g. a figurine play piece that can be placed inside a vehicle play piece) and where this is used, the levels close proximity and connected/attached (where used) do not include two play pieces which are nested inside each other.

It will be appreciated that in generating proximity data to three or more discrete, non-overlapping levels of proximity, the distance module 204 may determine a distance between the two play pieces based on the signals received (block 232, e.g. distance=32 cm) and then determine which proximity level the distance falls within (block 234, e.g. 32 cm corresponds to the level 'lack of proximity'), e.g. where the proximity levels are defined using distance thresholds. Alternatively, the distance module 204 may determine a proximity level without first determining a distance between the play pieces and instead may determine a signal parameter or characteristic (block 236, e.g. −45 dBm) and then quantize the signal parameters (block 238, e.g. −45 dBm corresponds to proximity level 'distant proximity'), e.g. where the proximity levels are defined using signal characteristic thresholds.

In various examples, the proximity data may comprise the actual determined distance between play pieces (from block 232) instead of using a predefined finite set of quantized proximity levels (i.e. block 234 is omitted).

In various examples, the proximity data (generated in block 226) may comprise additional information as well as a proximity level or actual distance. The additional information may, for example, comprise a relative location of the two pieces (e.g. in terms of angles, bearings, etc.) and/or information about the surroundings of the active play piece (e.g. light sources or proximate obstacles such as walls). In order to detect information about the surroundings, an active play piece 200 may further comprise one or more sensors 210 (e.g. a camera, light sensor, microphone, etc.).

The transmitter 206 is arranged to transmit proximity data (e.g. the proximity levels or actual distances) to the interactive entertainment experience 106 (block 228) either directly or via one or more intermediaries (which may include another active play piece). In various examples, the transmitter 206 may also be arranged to transmit signals used for distance determination by other active play pieces (block 222) and in some examples, the signals which comprise proximity data (transmitted in block 228) may also be used for distance determination by other active play pieces (i.e. blocks 222 and 228 may be combined). For example, an active device may use an array microphone to sense the angle of arrival of sounds generated by another play piece. In various examples the signals used for distance determination may use a different technology or protocol to the signals used to transmit proximity data and in such cases the active play piece may comprise two transmitters 206: one for transmitting signals used for distance determination by other active play pieces (in block 222) and one for transmitting proximity data to other active pieces or to the interactive entertainment experience (in block 228). In various examples, audio or ultrasound "pings" and responses may be used to determine distances between active play pieces.

Figure 3:
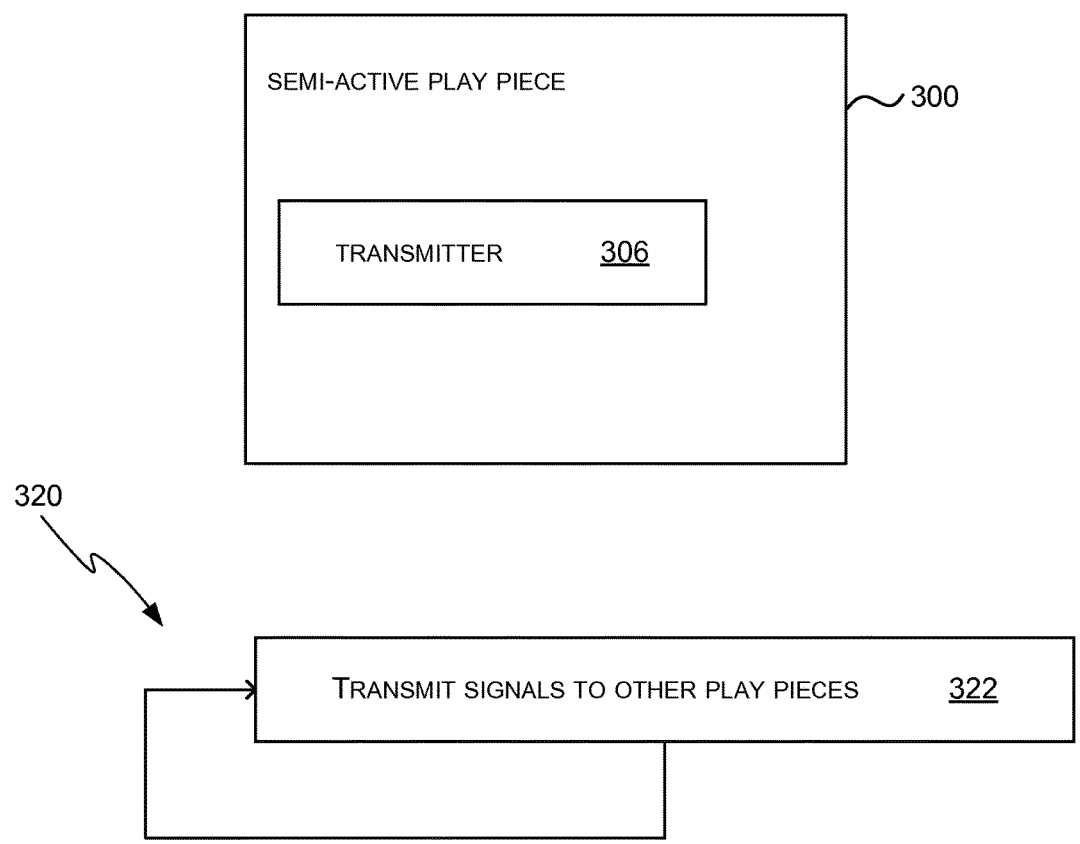
FIG. 3 is a schematic diagram of a semi-active play piece and a flow diagram of an example method of operation of a semi-active play piece.

FIG. 3 shows a schematic diagram of a semi-active play piece 300 and a flow diagram 320 of an example method of operation of a semi-active play piece 300. The semi-active play piece 300 comprises a transmitter 306 and does not comprise a distance module 204 (unlike the active play piece 200). The transmitter 306 is arranged to transmit signals which are used for distance determination by active play pieces (block 322).

There are many different technologies which may be used to transmit signals between play pieces and from an active play piece to the interactive entertainment experience. In various examples, Bluetooth® Low Energy (BLE) or another short range wireless protocol may be used by an active play piece 200 to transmit proximity data to other active play pieces and/or to the interactive entertainment experience 106 (in block 228). Consequently, transmitter 206 (or one of the transmitters 206 where there is more than one) may be a wireless transmitter and in particular may be a BLE transmitter. Where an active play piece 300 also comprises a receiver 202 which is arranged to receive proximity data from another active play piece, this receiver 202 (which may be the sole receiver 202 or one of the receivers 202 in the active play piece) may be a wireless receiver and in particular may be a BLE receiver.

The same technology (and hence the same transmitter and/or receiver) may be used to transmit/receive signals which are used in distance determination and in various examples RF field strength may be used and this may be capable of centimeter levels of accuracy. Other technologies which may be used to transmit/receive signals which are used in distance determination include, but are not limited to:

Infra-red (IR)—for example using IR LEDs as transmitters and IR detectors as receivers and determining proximity level based on received IR intensity Visible light—for example using LEDs in the visible spectrum (e.g. white LEDs) as transmitters and photodetectors as receivers and determining proximity level based on received light intensity (e.g. at the appropriate wavelength which corresponds to the emissions of the LEDs)

Active RFID tags

Magnetic field sensing

Ultrasonic or audio location—for example using ultrasonic or audible pings

RF time-of-flight

Where these other technologies (listed in the bullet points above) are used, an active play piece may comprise two receivers 202 and/or two transmitters 206 as described above with separate transmitters/receivers being used for the signals used for distance determination and the signals comprising the proximity data. As a semi-active piece does not perform distance determination and hence does not generate proximity data, a semi-active piece may comprise a single transmitter 306.

Figure 4:
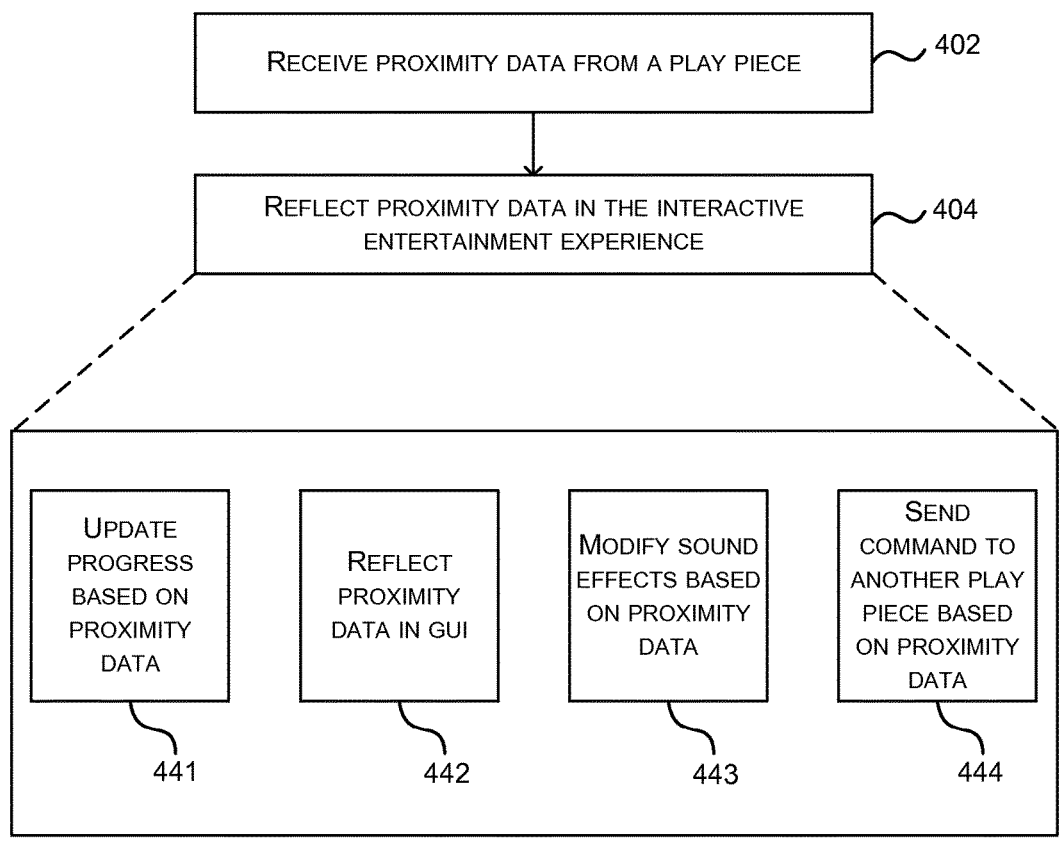
FIG. 4 is a flow diagram of an example method of operation of an associated interactive entertainment experience.

FIG. 4 is a flow diagram of an example method of operation of an associated interactive entertainment experience 106. As described above, this interactive entertainment experience 106 may comprise a computer game or virtual world which the user interacts with through manipulation of the set of play pieces. In various examples, a user may also interact with the interactive entertainment experience in other ways (e.g. via a mouse, keyboard, games controller, microphone, gesture recognition system, etc.).

Figure 5:
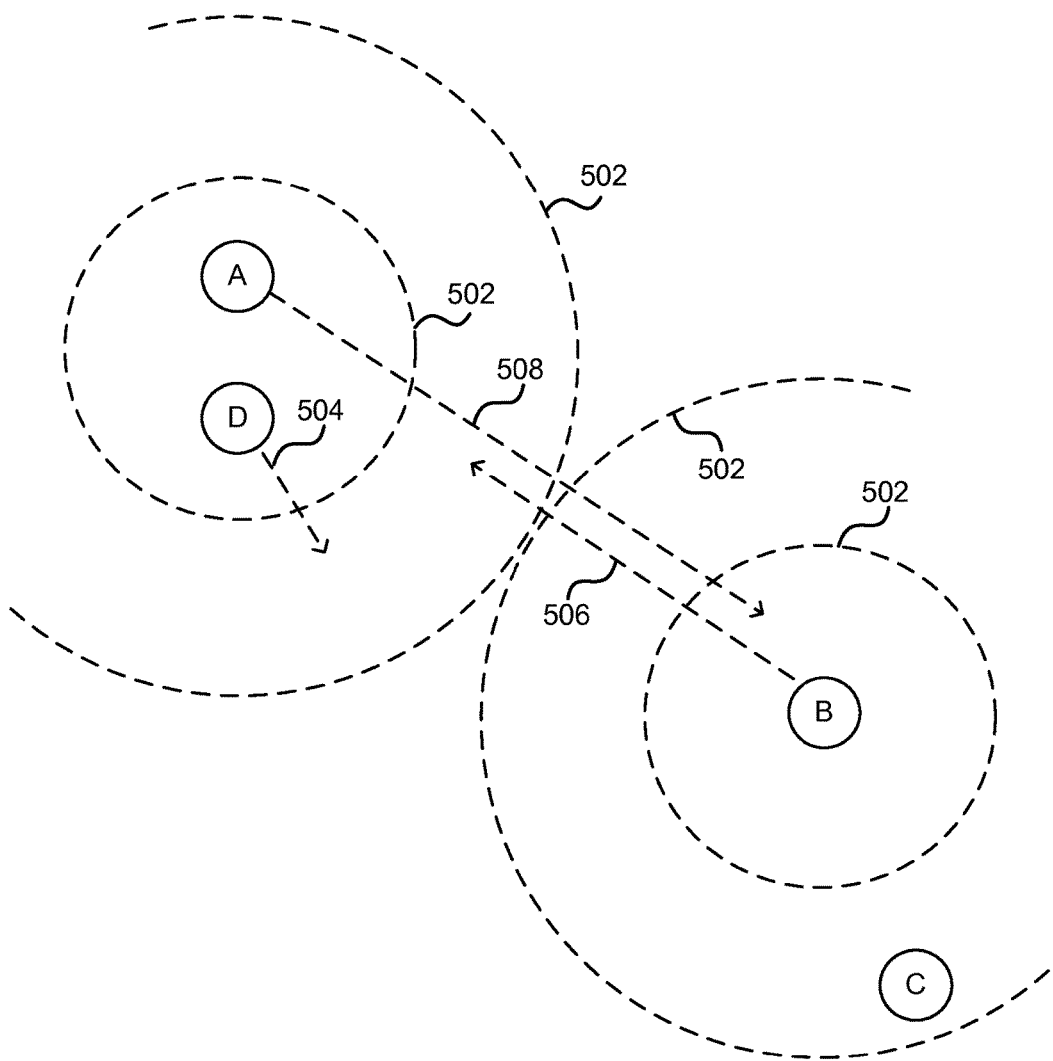
FIG. 5 is a schematic diagram showing thresholds between different proximity levels.

The interactive entertainment experience 106 receives proximity data from an active play piece (block 402). As described above, the proximity data describes distances between two or more play pieces sending signals and may be defined in terms of three or more discrete (i.e. non-overlapping) proximity levels (e.g. lack of proximity, distant proximity and close proximity) and an example arrangement of pieces is shown in FIG. 5. In the arrangement shown in FIG. 5, distance thresholds for the proximity levels are shown for pieces A and B as dotted circles 502, with the inner circles marking the border between close proximity and distant proximity levels and the outer circle marking the border between distant proximity and lack of proximity levels. Consequently, in the arrangement shown in FIG. 5 pieces A and B and pieces A and C and pieces B and D lack proximity. Additionally, pieces B and C have distant proximity and pieces A and D are in close proximity.

The interactive entertainment experience 106 modifies the user experience provided to reflect the proximity data received (block 404). This modification (in block 404) may be based on the absolute proximity data received (e.g. pieces A and D are in close proximity) and/or based on changes in proximity data (e.g. changes in proximity levels, such as if piece D moves as indicated by the dotted arrow 504 shown in FIG. 5). Various examples are described in more detail below and although these are described separately, it will be appreciated that any two or more may also be combined (e.g. such that the proximity data is reflected in the interactive entertainment experience by updating the progress of the user and modifying sound effects). When reflecting the proximity data in the interactive entertainment experience (in block 404) this may be apparent to (e.g. seen by, heard by) the user who is moving the physical play pieces and/or a remote user. For example, a change in proximity data caused by first user moving a play piece may be reflected in the GUI displayed to that user and/or a GUI displayed to a second user.

In various examples, the user's progress within a game or online world may be updated based on the proximity data (block 441). For example, a user's progress may be updated when particular combinations of pieces are in close proximity to each other (e.g. pieces A, B and C in the example shown in FIG. 5). The progression which is achieved (in block 441) based on the proximity data (received in block 402) may be linear progression (e.g. progression to the next level) or may be non-linear progression which results in an enhancement to the interactive entertainment experience (e.g. to the game play for a game). For example, the interaction may unlock some optional content e.g. a new avatar.

In various examples, the proximity data may be reflected within the graphical user interface (GUI) of the interactive entertainment experience (block 442). In an example, the interactive entertainment experience may display a map or plan of the arrangement of play pieces and their relative separation within the GUI (e.g. similar to that shown in FIG. 5) and this may be updated (in block 441) based on the proximity data received (in block 402).

In various examples, changes in proximity data (received in block 402) may result in changes to sound effects within the interactive entertainment experience (block 443). For example, where play piece A in FIG. 1 is a figurine and play piece D is a vehicle, as D approaches A, the sound of the vehicle D may be played as a sound effect within the interactive entertainment experience 106. In another example, play piece B may be a figurine of a dog and the volume of a barking noise sound effect may be increased if the distance between play piece A and play piece D reduces, as determined based on the proximity data received in block 402, e.g. as indicated by the dotted arrow 506 in FIG. 5 (e.g. for lack of proximity the volume level for sound effect associated with play piece D is zero, for distant proximity, the volume level is two and for close proximity the volume level is five, where an increase in volume level corresponds to the sound getting louder). In both of these examples (the vehicle example and the dog example), the user's location is associated with a particular play piece (e.g. play piece A in the examples), such that the sound effects are played as if the user is play piece A or is at the location of play piece A. Use of sound effects in this way enhances the user experience and the realism of the user's play with the physical play set.

In various examples, changes in proximity data (received in block 402) may result in commands being sent from one play piece to another (block 444), e.g. to cause an effect within the receiving play piece which is apparent (e.g. visible/audible) to a user. For example, if play piece A is a command center and play piece B is a vehicle, when play piece B approaches play piece A, the interactive entertainment experience may send a command to play piece A (block 444, and received by the play piece in block 229 in FIG. 2) to trigger LEDs in the play piece to be switched on (in block 230 in FIG. 2). This enhances the realism of the user's play with the play set and therefore improves user experience.

In various examples, changes in proximity data may cause a change in the ambient experience provided by the interactive entertainment experience. The ambient experience may comprise sound effects (which may include inaudible low frequency rumbles generated by a bass speaker) and/or visual effects within the GUI (e.g. by providing lighting effects—in one example, if the whole screen has greens and browns fading in and out, then the ambient experience induced may correspond to a jungle). For example, where the user is associated with play piece A (a figurine) and play piece B represents a beach location, if play piece A approaches play piece B (as indicated by dotted arrow 508 in FIG. 5) the volume of a "seaside" sound effect (e.g. waves, seagulls, etc.) may be increased (in block 443) and a beach view may become visible within the GUI (in block 442), e.g. it may grow larger, so that it looks like the user is getting closer to the beach. Use of ambient experiences enhances the user experience.

In various examples, the interactive entertainment experience may be a single user experience and/or it may be associated with a single play set (where one or more users may play with the play set at the same time). In various examples, however, it may be a multi-user experience. There are different ways in which a multi-user experience may be implemented. In various examples, users may play with different play sets and multiple play sets may be represented within the GUI to all the users. The multiple users (and hence play sets) may be co-located or they may be geographically distributed and their game play may only be connected via the interactive entertainment experience.

In other examples of a multi-user experience, a remote user, who may not have a play set, may be able to interact with a virtual representation of another user's play set. In such an example, a first user (in a first location) may create a particular arrangement of play pieces in the real world using the physical play pieces in a play set and this arrangement may be represented within the interactive entertainment experience (e.g. within a game or virtual world). Then a second user (in a second location which may be remote from the first location) may interact with that arrangement in the virtual world. In an example, the first user may set out an arrangement of toy soldiers (with each toy soldier being a play piece) or build a fortified castle (with parts of the castle being play pieces) and the second user may attack the virtual representation of the toy soldiers or castle. The results of the attack may be displayed to the first user within the interactive entertainment experience.

Figure 6:
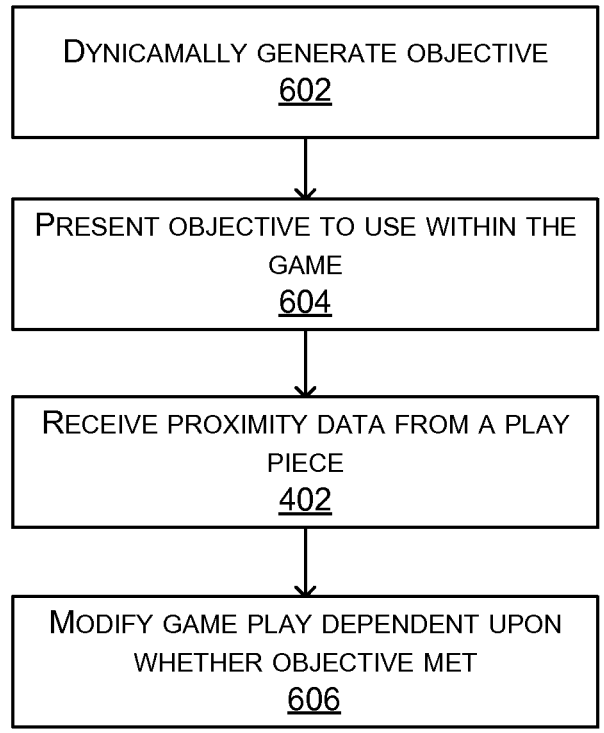
FIG. 6 is a flow diagram of a further example method of operation of an associated interactive entertainment experience.

As described above, in various examples the interactive entertainment experience 106 is a computer game and as well as responding to the user's arrangement of play pieces (by reflecting the proximity of the play pieces within the interactive entertainment experience in block 404) in a style of game play which may be described as non-directed (because the game does not force or suggest any particular interaction with the play pieces and any physical object constrained to the path), the game may also provide directed game play, as shown in FIG. 6.

In the directed game play, the game presents goals or objectives to the user (who might also be referred to as a player) within the game (block 604) where those goals/objectives require the player to interact with the physical play pieces in order to further progress within the game 106, i.e. the user cannot achieve the goal/objective without interacting with the physical pieces and changing the proximity of two or more pieces. For example, a user may need to bring a particular combination of play pieces into close proximity (e.g. blocks A, B and D) or move the pieces such that a piece is not proximate (e.g. blocks A and B in close proximity and lack of proximity between blocks A and C and blocks B and C), etc. In order to determine whether the objective has been met, the game receives (updated) proximity data from one or more physical pieces (block 402).

The game then modifies the game play (block 606) dependent upon whether the objective (set in block 604) has been met or not. By meeting the objective, the user may be able to progress to a new level, achieve a higher score, win a contest, unlock additional features (e.g. hidden features, mini-games, new levels, etc.) within the game, get an "achievement" awarded to them, assist other players in cooperative multiplayer scenarios, play against other players in competitive multiplayer scenarios, etc.

The progression which is achieved through the interaction with physical play pieces, and hence by achieving the objective set, may be linear progression (e.g. progression to the next level) or may be non-linear progression which results in an enhancement to the game play. For example, the interaction may unlock some optional content e.g. a new avatar for the virtual vehicle which is not required to complete the main storyline of the game.

The directed game play may be explicit, in that the goals/objectives and the corresponding need to move the physical play pieces are clearly communicated to the user (e.g. through messages within the GUI). Alternatively, the goals/objectives and/or the need to interact with the physical play pieces may be implicit, in that the goals/objectives or required arrangement of physical play pieces are known to the game but are not communicated to the user and must be discovered by the user. The use of implicit directed game play adds further challenges to the user and enhances the user experience.

The objectives which are presented to the user (in block 604) may be pre-defined and stored within the game software. Alternatively they may be generated dynamically (block 602). In various examples, they may be generated based at least in part on the information received from the physical play pieces (in block 402), e.g. they may be dependent on the current arrangement of physical play pieces. In various examples, the objective which is set may be generated based on the user's history (e.g. past performance) within the game or based on any other characteristics of the user or information about the user. Data detailing the user's history may, for example, be stored by the game itself or alternatively may be stored on a remote server and accessed by the game. By tailoring the objectives to be specific to a user, this enhances the overall user experience within the game. In examples where the objectives are dynamically generated (in block 602), this may comprise one or more of: choosing an objective or goal from a pre-existing list of possible objectives/goals (e.g. based on a characteristic of the user or another factor described above), creating an objective/goal based on random factors and using existing gameplay to date to influence the choice/creation of objective/goal.

FIG. 7 shows four more example play sets 701-704 which are designed for different types of play scenarios and/or play styles. The first example play set 701 comprises a plurality of play pieces 710-713 each of which is shaped like a real-world object (e.g. a person 710, an animal 711, a tree 712, a vehicle 713). The play pieces 710-713 can be moved freely by the user and do not physically attach (or connect) to each other and a user plays with the pieces on a surface 714 such as the floor or a table top. A user may, for example, act out a story using the play pieces 710-713 and the associated interactive entertainment experience may provide sound and/or visual effects based on the relative proximity of various play pieces.

In the second example play set 702 in FIG. 7 there are two different styles of play piece (where the style of a play piece is orthogonal to whether it is active/semi-active/passive)—bases 720-721 and objects 722-723. Each object play piece 722-723 is shaped like a real-world object (e.g. a person 722, a tree 723) and can be moved freely by the user; however the object play pieces 722-723 are usually placed on top of a base 720-721. The base play pieces 720-721 represent the environment and may have a flat upper surface (e.g. play piece 720) or may be contoured (e.g. play piece 721). In various examples, the base play pieces may be placed abutting each other and in other examples the base play pieces may be arranged so that they can be connected together (e.g. using interlocking features or connectors). In the example shown in FIG. 7, one base play piece 720 represents a beach environment and the other 721 represents a hill or mountainside. A user may, for example, act out a story using the play pieces 720-723 and the associated interactive entertainment experience may provide sound and/or visual effects based on the relative proximity of various play pieces.

The third example play set 703 in FIG. 7 comprises a number of figurines 730 and two towers 731. In this example, the figurines 730 may be semi-active play pieces and the two towers 731 may be active play pieces and determine the relative proximity of the figurines and also of the figurines and the towers. The fourth example play set 704 in FIG. 7 is similar to the third example 703, but only comprises a single tower 731. A user may (in either example 703-704), act out a story (such as a battle) using the figurines 730 (which may resemble soldiers or warriors) and the associated interactive entertainment experience may provide sound and/or visual effects based on the relative proximity of various play pieces.

Figure 8:
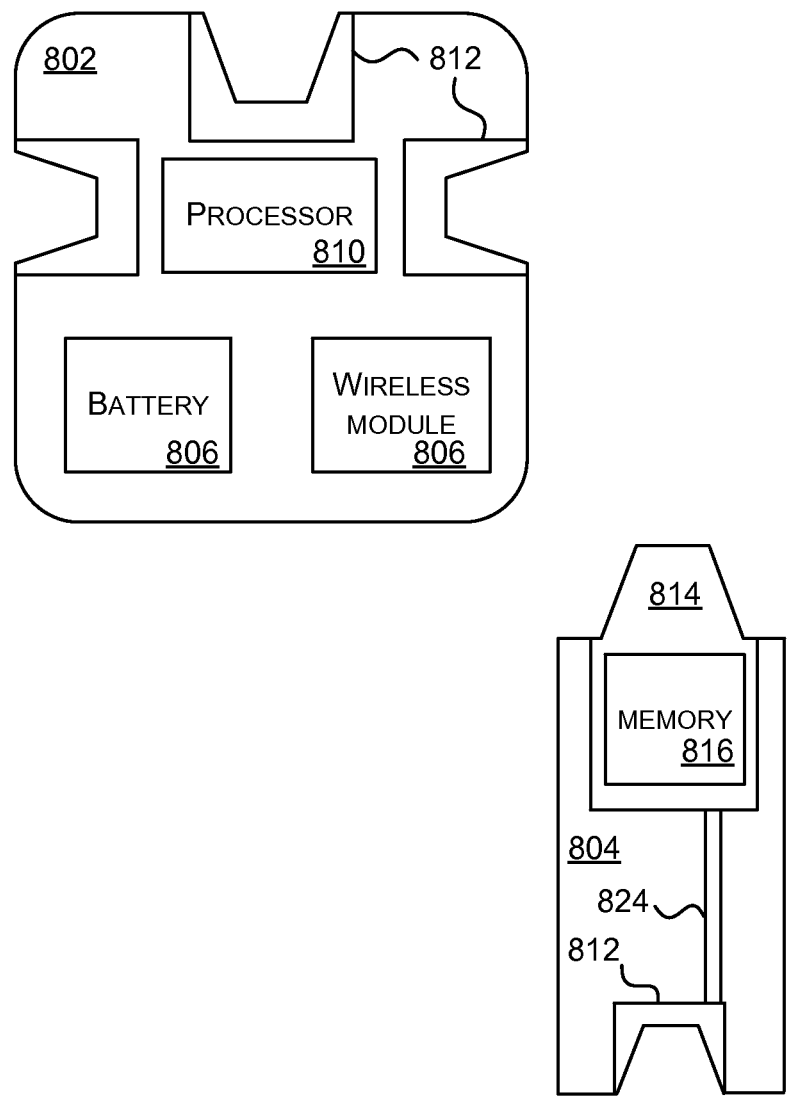
FIG. 8 is a schematic diagram of two example physical play pieces which form part of a set of physical play pieces.

In a further example, any of the play pieces described herein (e.g. any of the play pieces shown in the examples in FIG. 7) may be modular, i.e. they may be formed from a number of play pieces which are sub-components and which connect together to form a coherent physical whole object. FIG. 8 is a schematic diagram of two example physical play pieces which form part of a set of physical play pieces and which can be connected together to form an object play piece. FIG. 8 shows a core physical play piece 802 and a peripheral physical play piece 804. An object play piece may be formed from one or more core play pieces 802 and one or more peripheral play pieces 804. The core play piece 802 comprises a battery 806, a wireless communications module 808, a processor 810 and one or more connectors 812. The battery 806 provides power to components within the core (such as processor 810 and wireless communications module 808) and also to some/all of the peripheral play pieces 804 via the connectors 812. The wireless communications module 808 comprises a transmitter and in various examples also a receiver (and in various examples more than one transmitter and/or receiver) to enable the core play piece 802 (and hence the assembled object play piece) to operate as an active or semi-active play piece. The connectors 812 physically attach the peripheral play pieces 804 to the core play piece 802 and may also pass data and power between play pieces.

Where the object play piece is operative as an active play piece, the processor 810 within the core play piece 802 may be arranged to generate the proximity data (e.g. as in block 226 of FIG. 2). In various examples it may also collect the IDs (which may be a unique ID or an ID shared with other identical-looking play pieces, e.g. an ID for a particular shape or type of play piece) of each of the play pieces connected together to form an object play piece. The processor 810 may be a microprocessor, controller or any other suitable type of processor for processing computer executable instructions to control the operation of the core play piece in order to generate the proximity data (and in various examples also to collect the IDs of connected play pieces). Core and peripheral play pieces may be connected together in any way. Each peripheral play piece 804 comprises one or more connectors 812, 814 to physically attach the play piece to another play piece to form the object play piece. Where a peripheral play piece 804 comprises more than one connector 812, 814 it may further comprise electrical connections 824 (e.g. in the form of a bus comprising 2 wires, data and ground) between the two connectors 812, 814.

In various examples each peripheral play piece 804 may comprise a storage element 816 which stores an identifier (ID) for the peripheral play piece (which may be referred to as the play piece ID) and may comprise additional data. The storage element 816 may comprise memory or any other form of storage device. In the example shown in FIG. 8, the storage element 816 which stores the play piece ID is actually within the housing of the connector 814; however, in other examples it may be separate from the connector. In various examples, a peripheral play piece 804 may also comprise a processor (not shown in FIG. 8) and this too may be within the housing of the connector 814 or separate from the connector. In various examples, a peripheral play piece 804 may also comprise a battery (not shown in FIG. 8) and this may provide power to electronics within the peripheral play piece 804 and/or to neighboring play pieces (which may be peripheral or core play pieces). In this way, if an arrangement of play pieces requires more power than can be provided by the battery 806 in the core play piece 802, additional power can be provided by a battery in a peripheral play piece 804.

Although not shown in FIG. 8, a core play piece 802 may also comprise a storage element which stores an identifier for the play piece. As with the peripheral play piece, the storage element may comprise memory or any other form of storage device. The storage element which stores the play piece ID may be within a connector 812, the wireless module 808 or may be a separate entity within the core play piece 802.

It will be appreciated that the play pieces 802, 804 shown in FIG. 8 may comprise additional elements not shown in FIG. 8. It will further be appreciated that although FIG. 8 shows the modules of being square or rectangular, each of the play pieces can have any physical form factor (e.g. any shape of external housing) which is compatible with the other play pieces (i.e. each play piece is shaped such that it can connect to at least one other play piece, without the outer housing clashing).

In various examples, a play piece (which may be a peripheral play piece 804 or a core play piece 802) may comprise one or more sensors, actuators and/or displays that are controlled by and/or provide data to the processor 810 within the core play piece 802. Examples of sensors that may be used include: temperature sensors, vibration sensors, accelerometers, tilt sensors, gyroscopic sensors, rotation sensors, magnetometers, proximity sensors (active/passive infrared or ultrasonic), sound sensors, light sensors, etc. Examples of actuators that may be used include: electromagnets, motors, servos, vibration units, solenoids, speakers, etc. Examples of displays that may be used include one or more LEDs, a small LCD display, an e-ink display, etc. Where a play piece comprises a sensor, the sensor data may be communicated by the core play piece 802 to the game 106.

The play pieces and associated interactive entertainment experience described above may enable many different types of play. The examples shown in FIG. 7 illustrate a number of examples and further examples include dolls houses (e.g. where the bases 720-721 in the second example are shaped like rooms rather than being more planar base pieces and the pieces 722-723 are object/characters that may be placed in the dolls house). FIG. 9 shows a further example of a board game which is formed using play pieces as described above. In the example shown in FIG. 9, the base 901 is an active play piece and the pieces 902 which are placed on the base during game play may be active or semi-active play pieces (as described above. In the example shown, the pieces 902 are shaped like ships and the interactive entertainment experience is a battleship-like game which allows players to use physical pieces but still play against a remote opponent. Referring back to FIG. 2, each active piece generates proximity data (in block 226) and transmits this to the game (in block 228) so that the game can update the GUI for the remote user (e.g. in block 442 of FIG. 4) and in various examples enhance the user experience through sound effects (in block 443) or visual effects in other play pieces (in block 444). For example, when a ship is destroyed by an opponent it may light up (e.g. LEDs within the piece may be switched on based on commands received from the game in block 229) to indicate this. In further examples, the play set may comprise a different board game and pieces to be placed on the board game.

Figure 10:
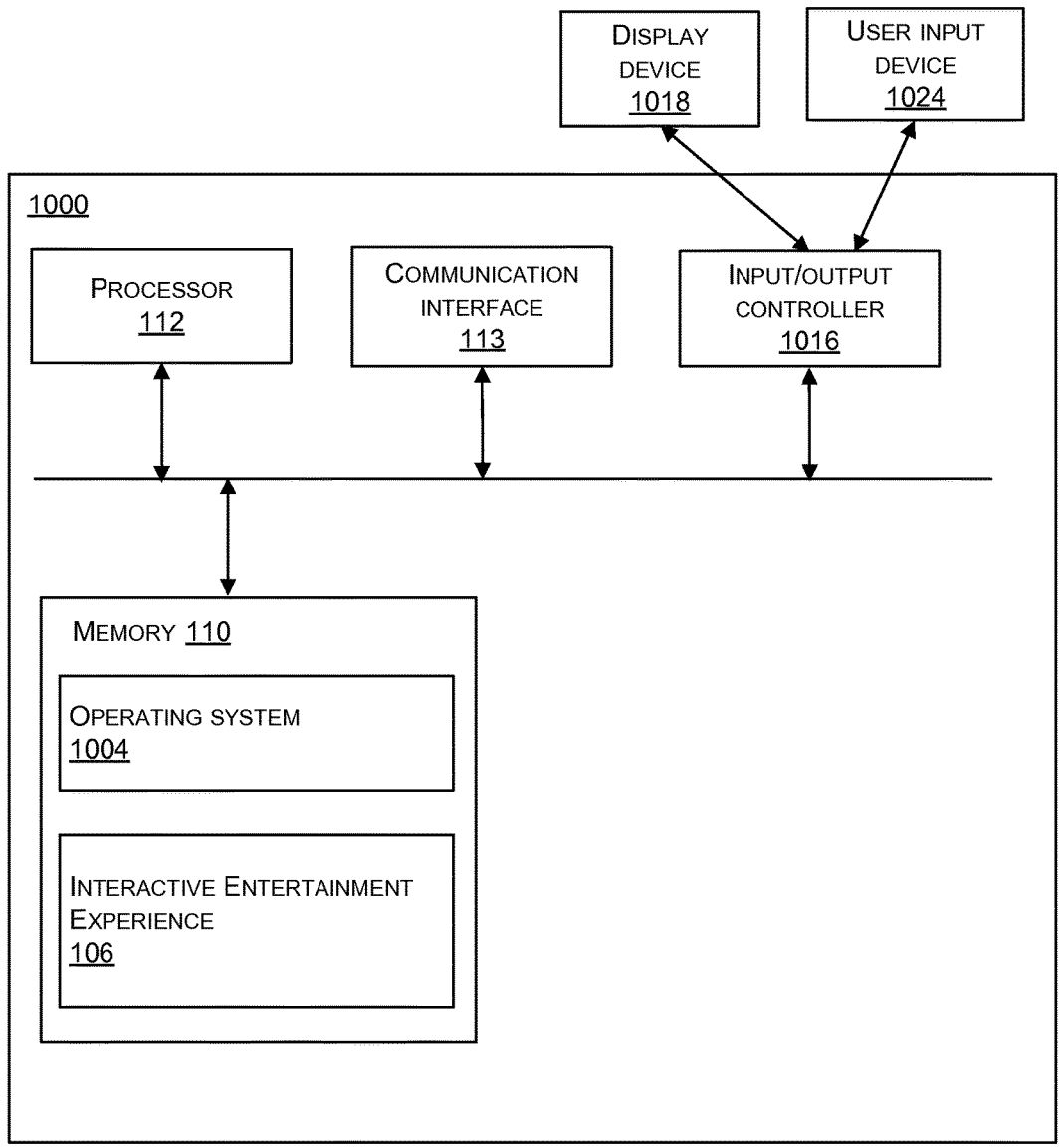
FIG. 10 illustrates an exemplary computing-based device in which embodiments of the methods described herein may be implemented.

FIG. 10 illustrates various components of an exemplary computing-based device 1000 which may be implemented as any form of a computing and/or electronic device, and in which embodiments of the methods described herein may be implemented. This computing based device 1000 may, for example, be the computing device 108 shown in FIG. 1 or a cloud-based computing device which runs the interactive entertainment experience 106.

Computing-based device 1000 comprises one or more processors 112 which may be microprocessors, controllers or any other suitable type of processors for processing computer executable instructions to control the operation of the device in order to perform the methods described herein (e.g. infer a path and present at least a part of the path in a GUI). In some examples, for example where a system on a chip architecture is used, the processors 112 may include one or more fixed function blocks (also referred to as accelerators) which implement a part of the method of path inference in hardware (rather than software or firmware).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 1004 or any other suitable platform software may be provided at the computing-based device to enable application software, such as an interactive entertainment experience 106 to be executed on the device.

The computer executable instructions may be provided using any computer-readable media that is accessible by computing based device 1000. Computer-readable media may include, for example, computer storage media such as memory 110 and communications media. Computer storage media, such as memory 110, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 110) is shown within the computing-based device 1000 it will be appreciated that the storage may be distributed or located remotely and accessed via a network or other communication link (e.g. using communication interface 113).

The communication interface 113 may be arranged to receive data from one or more physical play pieces and may comprise a wireless transmitter and/or wireless receiver. In various examples the communication interface 113 receives data from the physical play pieces directly and in other examples, the communication interface 113 may receive data from the play pieces via an intermediary device (e.g. where the computing-based device 1000 is a cloud-based device, the data may be received via a another computing-based device which is within range of the transmitters in the physical play pieces and the two computing devices may be connected via a network such as the internet). In examples where the play pieces comprise a feedback mechanism (e.g. LED, speaker, etc.) the communication interface 113 may also be arranged to transmit data (e.g. commands) to one or more physical play pieces (again these may be transmitted directly to the play pieces or via an intermediary device).

The computing-based device 1000 may also comprise an input/output controller 1016. The input/output controller may be arranged to output display information (e.g. the GUI) to a display device 1018 which may be separate from or integral to the computing-based device 1000. The input/output controller 1016 may also be arranged to receive and process input from one or more devices, such as a user input device 1024 (e.g. a mouse, keyboard, camera, microphone or other sensor). In some examples the user input device 1024 may detect voice input, user gestures or other user actions and may provide a natural user interface (NUI). This user input may be used to further control game play. In an embodiment the display device 1018 may also act as the user input device 1024 if it is a touch sensitive display device. The input/output controller 1016 may also output data to devices other than the display device, e.g. a locally connected printing device (not shown in FIG. 10).

Any of the input/output controller 1016, display device 1018 and the user input device 1024 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a play system (comprising a set of physical play pieces and an associated game) as shown in FIGS. 1, 7 and 8, the systems described are provided as examples and not limitations. As those skilled in the art will appreciate, the present examples are suitable for application in a variety of different types of play systems.

An aspect provides a system comprising a play set which in turn comprises one or more active physical play pieces. An active physical play piece comprises: a receiver operative to receive signals from one or more other physical play pieces; a distance module operative to generate proximity data using signals received by the receiver; and a transmitter operative to transmit proximity data to an interactive entertainment experience associated with the play set. The proximity data describes distances between two or more physical play pieces that are transmitting signals to three or more discrete levels of proximity and changes in proximity levels between play pieces are reflected in the interactive entertainment experience.

In various examples, the play set comprises two or more active physical play pieces. The play set may further comprise one or more semi-active play pieces, a semi-active play piece comprising: a transmitter operative to transmit signals to an active play piece. As described above, a semi-active piece does not comprise a distance module.

In various examples, the three or more discrete levels of proximity comprise a first level indicating a lack of proximity between play pieces, a second level indicating distant proximity between play pieces and a third level indicating close proximity between play pieces. The three or more discrete levels of proximity may further comprise one or more of: a proximity level indicating that two play pieces are connected together; and a proximity level indicating that one play piece is inside another play piece. In other examples, however, the three or more discrete levels of proximity comprise actual distances between play pieces.

In various examples, an active physical play piece further comprises a feedback device, wherein the feedback device is activated in response to a command received by the active physical play piece from the associated interactive entertainment experience.

In various examples, the receiver is a wireless receiver and the transmitter is a wireless transmitter.

In various examples, the active physical play piece represents an entity in the interactive entertainment experience and in some examples, the active physical play piece may have a shape and appearance which corresponds to the entity in the interactive entertainment experience. In various examples, some of the play pieces in a play set may be capable of connecting to each other and in other examples each of the play pieces in a play set may be a separate piece which does not comprise any mechanism for connecting it to another piece.

In various examples, some of the play pieces in a play set may comprise base boards and represent environments and others of the play pieces in the play set may represent objects or characters.

In various examples, the system further comprises a computing device arranged to run the interactive entertainment experience. In various examples, the interactive entertainment experience comprises device-executable instructions which when executed cause the computing device to: receive proximity data from a physical play piece; and reflect the proximity data in the interactive entertainment experience. Reflecting the proximity data in the interactive entertainment experience may comprise one or more of: updating a user's progress based on the proximity data; reflecting the proximity data in a graphical user interface; playing sound effects based on the proximity data; and sending a command to another physical play piece based on the proximity data.

In various examples, the interactive entertainment experience further comprises device-executable instructions which when executed cause the computing device to: present an objective (which may be dynamically generated) to the user within the interactive entertainment experience; determine whether the objective is met based on proximity data received; and modify the interactive entertainment experience in response to determining that the objective has been met.

A further aspect provides a method comprising: receiving signals at an active physical play piece from one or more other physical play pieces; generating proximity data in the active physical play piece based on signals received, the proximity data describing distances between two or more physical play pieces that are transmitting signals to three or more discrete levels of proximity; and transmitting the proximity data from the active physical play piece to an interactive entertainment experience running on a computing device.

In various examples, the method further comprises transmitting signals from the active play piece to one or more other physical play pieces. These signals may comprise the proximity data.

In various examples, the method further comprises: receiving a signal from the interactive entertainment experience at an active physical play piece; and in response to receiving the signal, controlling a feedback mechanism within the active physical play piece.

A yet further aspect provides a method comprising: receiving proximity data from an active physical play piece at an interactive entertainment experience, the proximity data describing distances between two or more physical play pieces that are transmitting signals to three or more discrete levels of proximity; and reflecting the proximity data in the interactive entertainment experience. Reflecting the proximity data in the interactive entertainment experience may comprise one or more of: updating a user's progress based on the proximity data; reflecting the proximity data in a graphical user interface; playing sound effects based on the proximity data; and sending a command to another physical play piece based on the proximity data.

In various examples, the interactive entertainment experience is a game and the method further comprises: presenting an objective (which may be dynamically generated) to a user within the game; and modifying game play dependent upon whether the user meets the objective.

Another aspect provides a system comprising a play set which in turn comprises one or more active physical play pieces. An active physical play piece comprises: a means for receiving signals from one or more other physical play pieces; a means for generating proximity data using signals received by the receiver; and a means for transmitting proximity data to an interactive entertainment experience associated with the play set. The proximity data describes distances between two or more physical play pieces that are transmitting signals to three or more discrete levels of proximity and changes in proximity levels between play pieces are reflected in the interactive entertainment experience.

In various examples, the means for transmitting proximity data may use one of: infra-red, radio-frequency signals, ultra-sonic signals, magnetic fields, etc.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising:
a play set comprising a plurality of physical play pieces, the plurality of physical play pieces comprising:
an active physical play piece, and
two or more additional physical play pieces, the two or more additional play pieces comprising:
a first semi-active physical play piece, wherein a semi-active physical play piece comprises a transmitter operative to transmit signals to an active physical play piece, but does not include a distance module operative to generate proximity data describing distances between the semi-active physical play piece and the other of the plurality of physical play pieces, and
at least one additional physical play piece that is either:
a second semi-active physical play piece, or
a passive physical play piece that does not transmit signals,
wherein the active physical play piece comprises:
a receiver operative to receive signals from one or more of the additional physical play pieces;
a distance module operative to generate proximity data into three or more discrete and non-overlapping levels of proximity using signals received by the receiver, the proximity data describing:
distances between the active physical play piece and the one or more of the additional physical play pieces, and
at least one distance between the two or more additional physical play pieces; and
a transmitter operative to transmit the proximity data to a computing device arranged to run an interactive entertainment experience associated with the play set, wherein the interactive entertainment experience comprises computing-device-executable instructions which when executed cause the computing device to:
receive the proximity data from the active physical play piece, and
reflect in the interactive entertainment experience one or more changes in proximity levels between two or more of the plurality of physical play pieces.

2. The system according to claim 1, wherein the play set comprises two or more active physical play pieces.

3. The system according to claim 1, wherein the three or more discrete and non-overlapping levels of proximity comprise a first level indicating a lack of proximity between play pieces, a second level indicating distant proximity between play pieces and a third level indicating close proximity between play pieces.

4. The system according to claim 1, wherein the three or more discrete levels of proximity further comprise one or more of:
a proximity level indicating that two play pieces are connected together; and
a proximity level indicating that one play piece is inside another play piece.

5. The system according to claim 1, wherein the three or more discrete levels of proximity comprise actual distances between play pieces.

6. The system according to claim 1, wherein an active physical play piece further comprises a feedback device, wherein the feedback device is activated in response to a command received by the active physical play piece from the associated interactive entertainment experience.

7. The system according to claim 1, wherein the receiver is a wireless receiver and the transmitter is a wireless transmitter.

8. The system according to claim 1, wherein an active physical play piece represents an entity in the interactive entertainment experience.

9. The system according to claim 1, wherein reflecting the proximity data in the interactive entertainment experience comprises one or more of:
   updating a user's progress based on the proximity data;
   reflecting the proximity data in a graphical user interface;
   playing sound effects based on the proximity data; and
   sending a command to another physical play piece based on the proximity data.

10. The system according to claim 1, wherein the interactive entertainment experience further comprises device-executable instructions which when executed cause the computing device to:
   present an objective to the user within the interactive entertainment experience game; determine whether the objective is met based on proximity data received; and
   modify the interactive entertainment experience game in response to determining that the objective has been met.

11. The system according to claim 1, wherein the two or more additional physical play pieces further comprise at least one passive play piece, wherein the at least one passive play piece does not transmit signals.

12. A method comprising:
   receiving signals at an active physical play piece from two or more other physical play pieces, the two or more other physical play pieces comprising:
      a first semi-active physical play piece, wherein a semi-active physical play piece comprises a transmitter operative to transmit signals to an active physical play piece, but does not include a distance module operative to generate proximity data describing distances between the semi-active physical play piece and the other of the plurality of physical play pieces, and
      at least one additional physical play piece that is either:
         a second semi-active physical play piece, or
         a passive physical play piece that does not transmit signals;
   generating proximity data in the active physical play piece based at least in part on signals received, the proximity data describing distances between the active physical play piece and the two or more other physical play pieces, as well as one or more distances between the first semi-active physical play piece and the at least one additional physical play piece, into three or more discrete and non-overlapping levels of proximity; and
   transmitting the proximity data from the active physical play piece to an interactive entertainment experience running on a computing device,
   wherein the interactive entertainment experience comprises computing-device executable instructions which when executed cause the computing device to receive the proximity data from the active physical play piece and reflect changes in proximity levels between two or more of the physical play pieces in the interactive entertainment experience.

13. The method according to claim 12, further comprising: transmitting signals from the active play piece to the one or more other physical play pieces.

14. The method according to claim 13, wherein the signals transmitted from the active physical play piece to the one or more other physical play pieces comprise the proximity data.

15. The method according to claim 12, further comprising:
   receiving a signal from the interactive entertainment experience at the active physical play piece; and
   in response to receiving the signal, controlling a feedback mechanism within the active physical play piece.

16. The method according to claim 12, wherein the three or more discrete and non-overlapping levels of proximity comprise a first level indicating a lack of proximity between play pieces, a second level indicating distant proximity between play pieces and a third level indicating close proximity between play pieces.

17. A method comprising:
   receiving proximity data from an active physical play piece at an interactive entertainment experience, the proximity data describing distances between the active physical play piece and two or more other physical play pieces comprising one or more semi-active physical play pieces and one or more passive physical play pieces that do not transmit signals, as well as one or more distances between at least one of the one or more semi-active play pieces and at least one of the one or more passive play pieces, into three or more discrete and non-overlapping levels of proximity, wherein a semi-active physical play piece comprises a transmitter operative to transmit signals to an active physical play piece, but does not include a distance module operative to generate proximity data describing distances between the semi-active physical play piece and the other of the plurality of physical play pieces; and
   reflecting the proximity data in the interactive entertainment experience,
   wherein the interactive entertainment experience comprises computing-device executable instructions which when executed cause the computing device to receive the proximity data from the active physical play piece and reflect changes in proximity levels between two or more of the physical play pieces in the interactive entertainment experience.

18. The method according to claim 17, wherein reflecting the proximity data in the interactive entertainment experience comprises one or more of:
   updating a user's progress based on the proximity data;
   reflecting the proximity data in a graphical user interface;
   playing sound effects based on the proximity data; and
   sending a command to another physical play piece based on the proximity data.

19. The method according to claim 17, wherein the interactive entertainment experience is a game and wherein the method further comprises:
   presenting an objective to a user within the interactive entertainment experience game; and
   modifying game play dependent upon whether the user meets the objective.

20. The method according to claim 17, wherein the three or more discrete and non-overlapping levels of proximity comprise a first level indicating a lack of proximity between play pieces, a second level indicating distant proximity between play pieces and a third level indicating close proximity between play pieces.

21. The method according to claim 17, wherein the active physical play piece comprises a feedback device, wherein the feedback device is activated in response to a command received by the active physical play piece from the interactive entertainment experience.

\* \* \* \* \*